United States Patent
Fujishiro et al.

(10) Patent No.: US 9,693,358 B2
(45) Date of Patent: Jun. 27, 2017

(54) COMMUNICATION CONTROL METHOD, MOBILE COMMUNICATION SYSTEM, AND BASE STATION

(71) Applicant: KYOCERA CORPORATION, Kyoto (JP)

(72) Inventors: Masato Fujishiro, Yokohama (JP); Kugo Morita, Yokohama (JP); Chiharu Yamazaki, Ota-ku (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 266 days.

(21) Appl. No.: 14/355,164

(22) PCT Filed: Nov. 2, 2012

(86) PCT No.: PCT/JP2012/078522
§ 371 (c)(1),
(2) Date: Apr. 29, 2014

(87) PCT Pub. No.: WO2013/065841
PCT Pub. Date: May 10, 2013

(65) Prior Publication Data
US 2014/0307687 A1 Oct. 16, 2014

Related U.S. Application Data

(60) Provisional application No. 61/555,250, filed on Nov. 3, 2011.

(51) Int. Cl.
*H04W 72/08* (2009.01)
*H04W 16/16* (2009.01)
(Continued)

(52) U.S. Cl.
CPC ......... *H04W 72/082* (2013.01); *H04W 16/16* (2013.01); *H04W 72/0473* (2013.01);
(Continued)

(58) Field of Classification Search
None
See application file for complete search history.

(56) References Cited

U.S. PATENT DOCUMENTS

8,494,533 B2 * 7/2013 Boudreau ............. H04W 16/28
455/445
8,515,426 B2 8/2013 Matsuo et al.
(Continued)

FOREIGN PATENT DOCUMENTS

JP 2011-087009 A 4/2011
JP 2011-146805 A 7/2011
(Continued)

OTHER PUBLICATIONS

Chttl, Itri "Indentify Cell Edge Users by Using Maximum RSRP Trigger Threshold in ICIC Operation." Feb. 13, 2009 3GPP TSG-RAN WG1 #56 R1-090955.*
(Continued)

*Primary Examiner* — Robert M Morlan
(74) *Attorney, Agent, or Firm* — Studebaker & Brackett PC

(57) ABSTRACT

A communication control method in a mobile communication system having a first base station and a second base station having a smaller coverage area than the first base station, comprises: a step A of transmitting information indicating interference in uplink detected by the second base station, from the second base station to the first base station; a step B of performing processing by the first base station and/or the second base station to change a radio environment around the boundary of a coverage area of the second base station; and a step C of identifying an interfering user terminal in the uplink by the first base station, from first user
(Continued)

terminals being connected with the first base station, based on radio environment information reported by the first user terminals.

3 Claims, 12 Drawing Sheets

(51) Int. Cl.
*H04W 72/04* (2009.01)
*H04W 36/00* (2009.01)
*H04W 36/20* (2009.01)
*H04W 84/04* (2009.01)
*H04W 36/04* (2009.01)

(52) U.S. Cl.
CPC ........ *H04W 36/0094* (2013.01); *H04W 36/04* (2013.01); *H04W 36/20* (2013.01); *H04W 84/045* (2013.01)

(56) References Cited

U.S. PATENT DOCUMENTS

| | | | |
|---|---|---|---|
| 8,654,728 B2* | 2/2014 | Gunnarsson | H04W 28/048 370/329 |
| 8,666,391 B2 | 3/2014 | Duan | |
| 2002/0151278 A1 | 10/2002 | McLain et al. | |
| 2009/0109939 A1 | 4/2009 | Bhushan et al. | |
| 2010/0120367 A1* | 5/2010 | Nanda | H04B 7/024 455/63.1 |
| 2011/0085448 A1 | 4/2011 | Kuwahara | |
| 2011/0098055 A1* | 4/2011 | Kwon | H04W 52/08 455/452.2 |
| 2012/0076039 A1* | 3/2012 | Kwon | H04B 7/0634 370/252 |
| 2012/0083280 A1* | 4/2012 | Liu | H04W 16/14 455/446 |
| 2012/0142339 A1 | 6/2012 | Duan | |
| 2013/0090127 A1 | 4/2013 | Nishikawa et al. | |

FOREIGN PATENT DOCUMENTS

| | | | |
|---|---|---|---|
| JP | 2012-005086 A | 1/2012 | |
| KR | WO 2010137917 A2 * | 12/2010 | ............ H04B 7/026 |
| WO | 2010/070854 A1 | 6/2010 | |
| WO | 2011/005537 A2 | 1/2011 | |
| WO | 2011/021389 A1 | 2/2011 | |

OTHER PUBLICATIONS

The extended European search report issued by the European Patent Office on Oct. 22, 2015, which corresponds to European Patent Application No. 12845669.6-1857 and is related to U.S. Appl. No. 14/355,164.
Communication pursuant to Rules 70(2) and 70a(2) EPC issued by the European Patent Office on Nov. 10, 2015, which corresponds to European Patent Application No. 12845669.6-1857 and is related to U.S. Appl. No. 14/355,164.
Kyocera Corp; "Carrier-based HetNet ICIC"; 3GPP; TSG-RAN WG3 #73bis; R3-112611; Oct. 10-14, 2011; pp. 1-4; Zhuhai, China.
International Search Report; PCT/JP2012/078522; Jan. 22, 2013.
3GPP TS RAN WG1 Meeting #62; I2R; "eICIC for HeNB UL and MUE DL based on HeNB UL Measurement"; Madrid, Spain; Aug. 23-27, 2010; R1-104732 (Update of R1-103951).
3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-194.
JP Office Action dated Nov. 22, 2016 from corresponding JP Appl No. 2016-041370 with concise statement of relevance, 5 pp.

\* cited by examiner

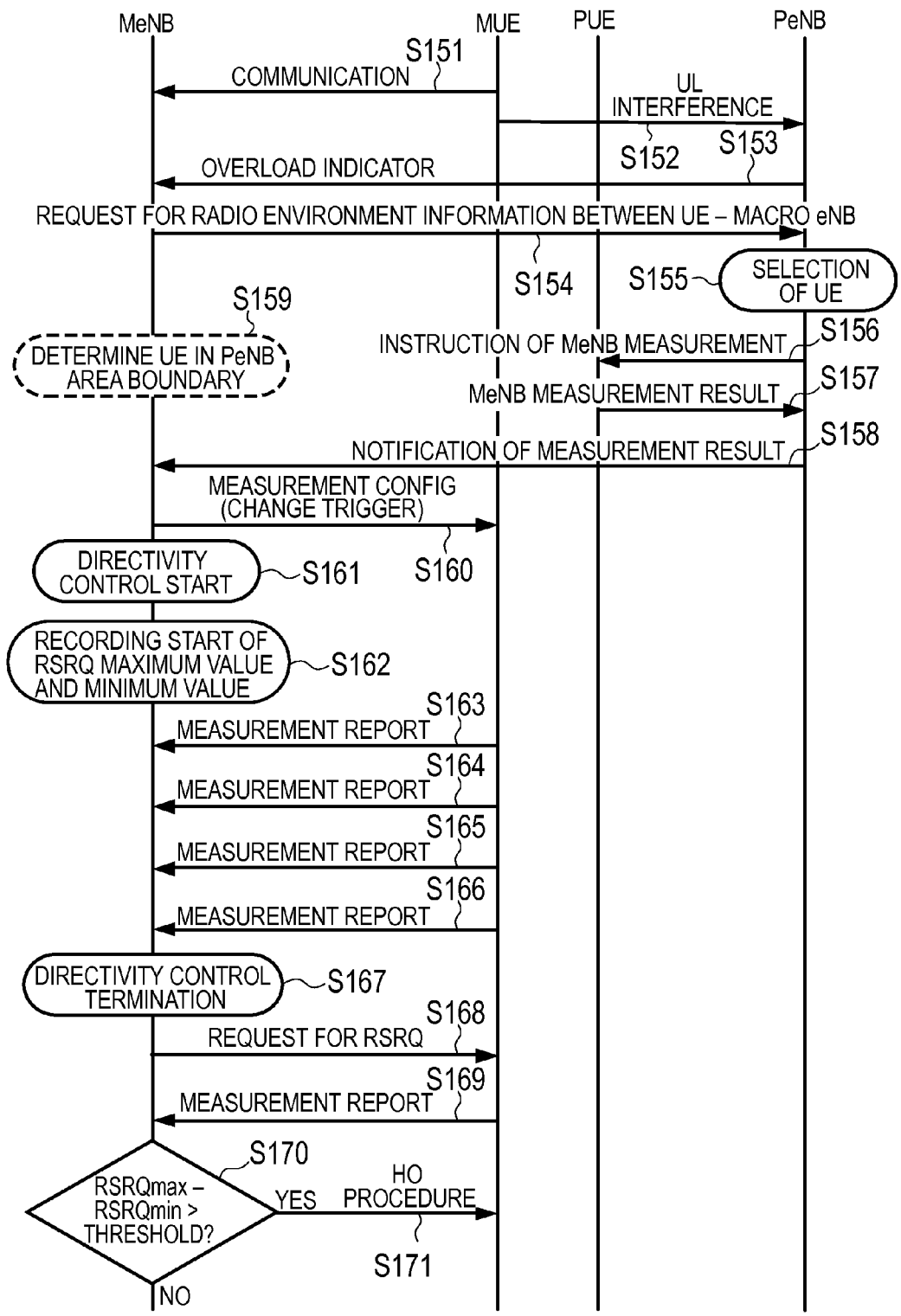

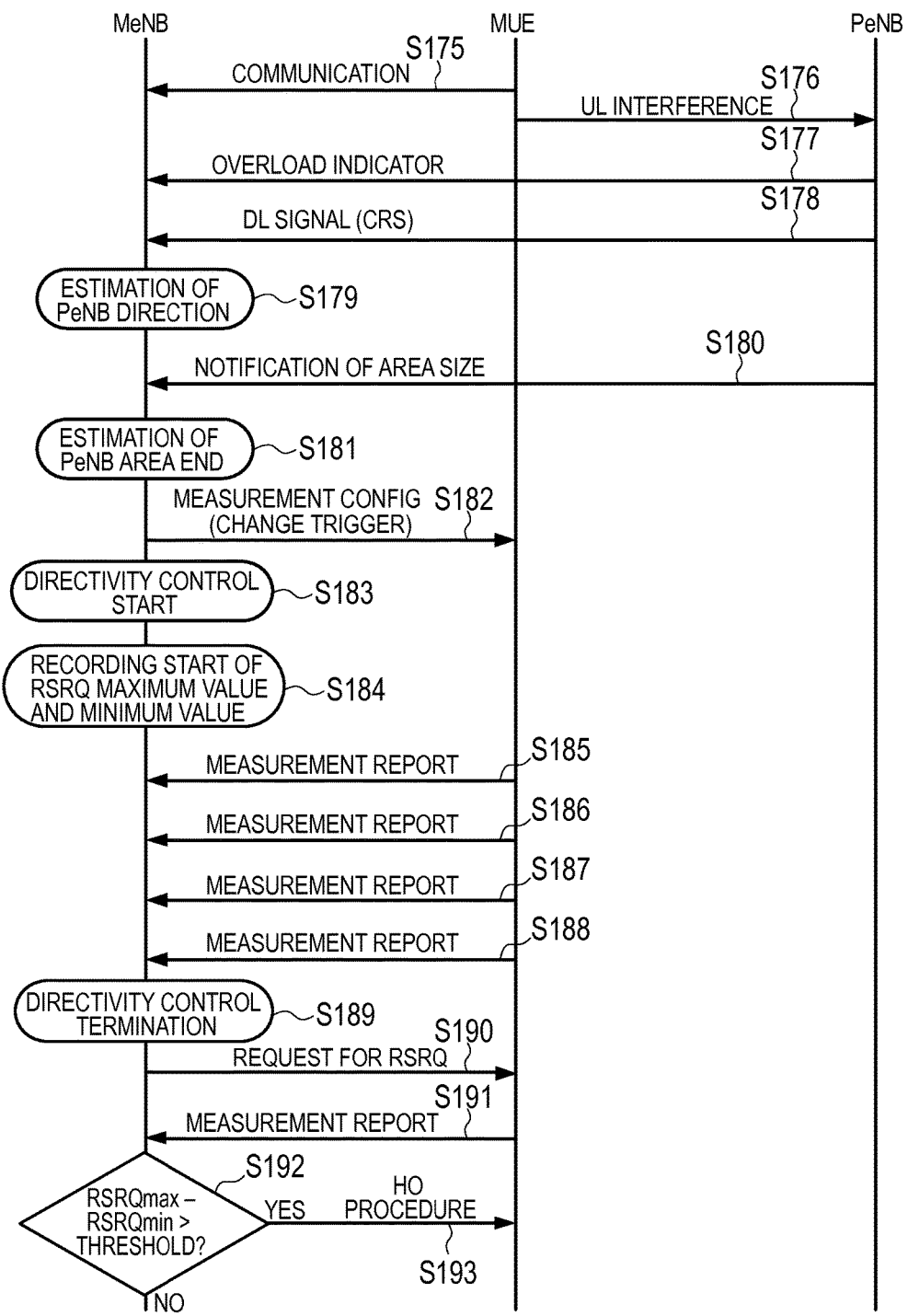

COMMUNICATION CONTROL METHOD, MOBILE COMMUNICATION SYSTEM, AND BASE STATION

TECHNICAL FIELD

The present invention relates to a communication control method, a mobile communication system, and a base station in a heterogeneous network.

BACKGROUND ART

The 3GPP (3rd Generation Partnership Project) that is a standardization project of mobile communication systems is working on standardization of LTE Advanced that is an advanced version of LTE (Long Term Evolution) in 3GPP release-10 or later (see, for example, Non-Patent Document 1).

In LTE-Advanced, provision of a heterogeneous network is under study in which a low power base station (so-called pico base station or home base station) is installed in a coverage area of a high-power base station (so-called, a macro base station). The heterogeneous network can distribute a load of the high-power base station to the low-power base station.

PRIOR ART DOCUMENT

Non-Patent Document

Non-Patent Document 1: 3GPP TS 36.300 V10.4.0

SUMMARY OF THE INVENTION

When a high-power base station and a low-power base station use the same carrier in a heterogeneous network and a user terminal connected with the high-power base station is located around the boundary of a coverage area of the low-power base station, the low-power base station receives uplink interference from the user terminal.

In this regard, if which user terminal is an interfering source can be identified, the uplink interference can be solved by causing the user terminal of an interference source (hereinafter referred to as an "interfering user terminal") to perform handover to another carrier.

However, there is a problem that a low-power base station can become aware of the reception of the uplink interference, but cannot identify the interfering user terminal.

Also, there is another problem that a high-power base station and a user terminal connected therewith cannot become aware that the user terminal is giving the uplink interference to the low-power base station, nor can identify the interfering user terminal.

For this reason, the present invention provides a communication control method, a mobile communication system, and a base station that are capable of identifying an uplink interfering user terminal.

A communication control method according to the present invention is a communication control method in a mobile communication system having a first base station (e.g. MeNB 100-1) and a second base station (e.g. PeNB 100-2) having a smaller coverage area than the first base station. The method comprises: a step A of transmitting information indicating interference in uplink detected by the second base station, from the second base station to the first base station; a step B of performing processing by the first base station and/or the second base station to change a radio environment around the boundary of a coverage area of the second base station; and a step C of identifying an interfering user terminal in the uplink by the first base station, among first user terminals (e.g. MUE 200-1) being connected with the first base station, based on radio environment information reported by the first user terminals.

With another feature of the communication control method according to the present invention, the step B comprises the step in which the first base station controls transmission directivity of the first base station so as to change a radio environment around the boundary of the coverage area of the second base station.

With another feature of the communication control method according to the present invention, the step B further comprises the steps in which: the first base station requests transmission of predetermined information based on a channel characteristic between a second user terminal (e.g. PUE 200-2) being connected with the second base station and the first base station; and the second base station transfers the predetermined information reported by the second user terminal to the first base station, and at the directivity control step, the first base station controls the transmission directivity based on the predetermined information transferred from the second base station.

With another feature of the communication control method according to the present invention, the step B further comprises the steps in which: when receiving a reference signal transmitted from the second base station, the first base station estimates an arrival direction of the received reference signal, and the second base station notifies the first base station of size information indicating a size of the coverage area of the second base station, and at the directivity control step, the first base station controls the transmission directivity based on the estimated arrival direction and the size information notified from the second base station.

With another feature of the communication control method according to the present invention, the step B comprises a directivity control step in which the second base station controls transmission directivity of the second base station so as to change a radio environment around the boundary of the coverage area of the second base station.

With another feature of the communication control method according to the present invention, the step B further comprises the steps in which: the first base station requests the second base station to start the transmission directivity control; the second base station notifies the first base station of start of the transmission directivity control when the transmission directivity control is started; and the second base station notifies the first base station of termination of the transmission directivity control when the transmission directivity control is terminated.

With another feature of the communication control method according to the present invention, the step B comprises a transmission power control step in which the first base station controls transmission power of the first base station so as to change a radio environment around the boundary of the coverage area of the second base station.

With another feature of the communication control method according to the present invention, the step B comprises a transmission power control step in which the second base station controls transmission power of the second base station so as to change a radio environment around the boundary of the coverage area of the second base station.

With another feature of the communication control method according to the present invention, the step B further comprises the steps in which the first base station requests the second base station to start the transmission power control; the second base station notifies the first base station of start of the transmission power control when starting the transmission power control; and the second base station notifies the first base station of termination of the transmission power control when terminating the transmission power control.

With another feature of the communication control method according to the present invention, in the step C, the first base station identifies the first user terminal as the interfering user terminal in a case where a change amount in the radio environment information reported by the first user terminal two or more times within a period of the step B exceeds a threshold.

With another feature of the communication control method according to the present invention, in the step C, the first base station identifies the first user terminal as the interfering user terminal in a case where a measurement result for the second base station is not contained in the radio environment information reported by the first user terminal before the step B and where a measurement result for the second base station is contained in the radio environment information reported by the first user terminal within a period of the step B.

With another feature of the communication control method according to the present invention, the step C comprises a step C1 in which a target user terminal to be a candidate for the interfering user terminal is selected from the first user terminals based on first radio environment information reported by the first user terminals, and a step C2 in which the interfering user terminal is identified from the target user terminals based on second radio environment information reported by the target user terminal selected at step C1.

A mobile communication system according to the present invention is a mobile communication system comprising a first base station and a second base station having a smaller coverage area than the first base station. The second base station transmits information indicating interference in uplink detected by the second base station to the first base station, the first base station and/or the second base station perform processing to change a radio environment around the boundary of a coverage area of the second base station, and the first base station identifies an interfering user terminal in the uplink from first user terminals being connected with the first base station, based on radio environment information reported by the first user terminals.

A base station according to the present invention is a base station in a mobile communication system. The base station comprises: a control unit configured to control transmission directivity or transmission power so as to change a radio environment around the boundary of a coverage area of a different base station; wherein, the control unit identifies an uplink interfering user terminal to the different base station among user terminals being connected with the base station, based on the radio environment information reported by the user terminals.

BRIEF DESCRIPTION OF THE DRAWINGS

FIG. 11 shows another operational sequence according to the first embodiment.
FIG. 12 shows another operational sequence according to a modification of the first embodiment.

DESCRIPTION OF THE EMBODIMENT

Figure 1:
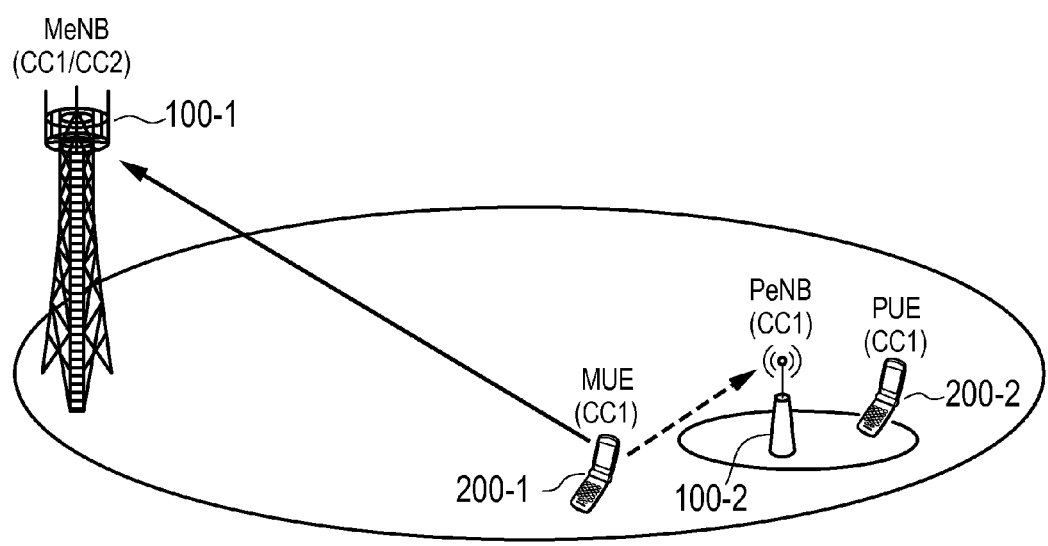
FIG. 1 shows a mobile communication system according to first to fourth embodiments.

Embodiments of the present invention are described below by referring to the drawings. In the drawings of each embodiment, same or similar reference numerals are given to denote same or similar portions.

First Embodiment

FIG. 1 shows a mobile communication system according to the present embodiment. A mobile communication system according to the present embodiment is configured based on LTE Advanced (in 3GPP Release 10 or later).

As shown in FIG. 1, the mobile communication system has a macro base station (Macro evolved Node-B: MeNB) 100-1 forming a large-sized coverage area and a pico cell base station (Pico evolved Node-B: PeNB) 100-2 forming a small-sized coverage area. Each of the MeNB 100-1 and the PeNB 100-2 is connected with one or multiple user terminals (User Equipment: UE).

In the following, a UE connected with the MeNB 100-1 is referred to as an MUE 200-1 and a UE connected with the PeNB 10-2 is referred to as a PUE 200-2. In addition, when the MeNB 100-1 and the PeNB 100-2 are not particularly distinguished from each other, they are simply called as an eNB 100. Moreover, when the MUE 200-1 and the PUE 200-2 are not particularly distinguished from each other, they are simply referred to as a UE 200.

Note that connection means a state where the UE 200 is synchronized with the eNB 100, that is, a state where a radio resource can be allocated from the eNB 100 to the UE 200. Also, uplink means a communication direction from the UE 200 to the eNB 100, and downlink means a communication direction from the eNB 100 to UE 200.

The MeNB 100-1 and the PeNB 100-2 are included in the E-UTRAN (Evolved-UMTS Terrestrial Radio Access Network), which is the LTE radio access network. In the present embodiment, the E-UTRAN is configured as a heterogeneous network. The PeNB 100-2 is installed in a high-traffic zone (so-called, a hot zone) within the coverage area of the MeNB 100-1, for example.

In the present embodiment, the MeNB 100-1 supports two different carriers (CC1, CC2) and can use a carrier selected from the two carriers for radio communications. Each carrier includes multiple resource blocks (RB) in a frequency direction. In addition, in the embodiment, the PeNB 100-2 supports one carrier (CC1) and uses the one carrier for radio communications. When the MeNB 100-1 and the PeNB 100-2 use the same carrier (CC1) and the MUE 200-1 using the CC1 is located around the boundary of the coverage area of the PeNB 100-2, the PeNB 100-2 may receive uplink interference from the MUE 200-1. In the present embodiment, the MeNB 100-1 identifies an MUE 200-1 of an interference source based on the measurement report from the MUE 200-1, and tries to solve the uplink interference by, for example, causing the MUE 200-1 of the interference source to perform handover to the other carrier (CC2).

The coverage area is configured of one or multiple cells. The cell is identified by a cell ID and is associated with a carrier. Note that a carrier and an eNB 100 using the carrier are sometimes collectively referred to as a cell. For this reason, the MeNB 100-1 is sometimes referred to as a micro cell and the PeNB 100-2 is referred to as a pico cell.

The UE 200 can switch a cell of a connection destination (referred to as serving cell) in a connected (RRC Connected) state equivalent to a state of being connected. Such serving cell switching is implemented by, for example, handover. The handover of the UE 200 is controlled by the serving cell of the UE 200.

An X2 interface, which is a logical communication channel for connecting neighbor base stations to each other, is set up between the MeNB 100-1 and the PeNB 100-2. Also, an S1 interface that is a logical communication channel with the EPC is set up between an EPC (Evolved Packet Core) that is an LTE core network, and the MeNB 100-1 and between the EPC and the PeNB 100-2.

Figure 2:
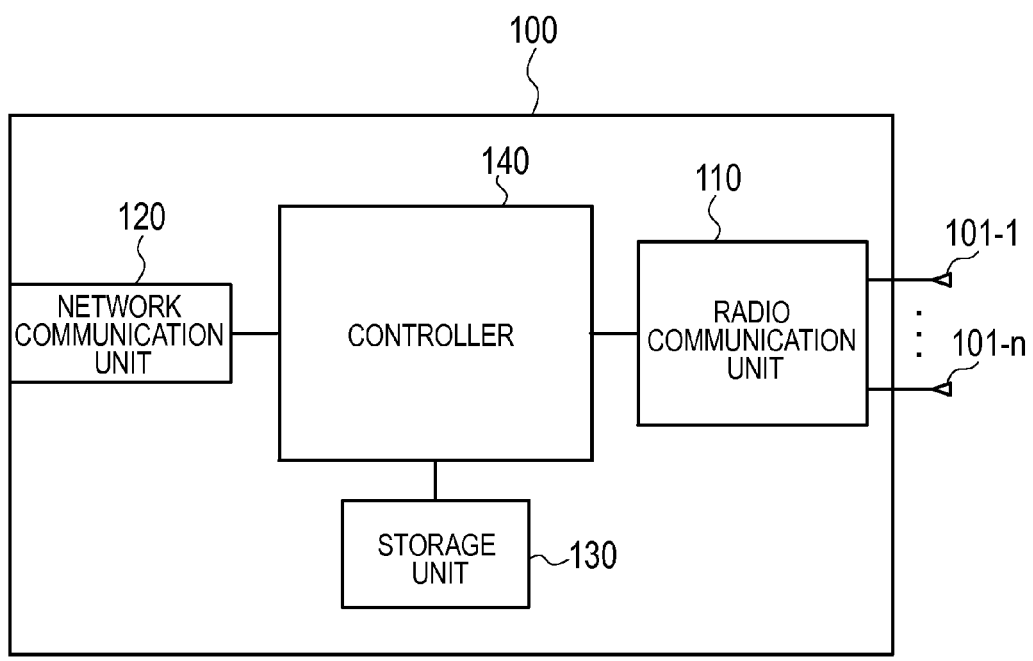
FIG. 2 is a block diagram of an eNB according to the first to fourth embodiments.

Hereinafter, the configuration of the eNB 100 is described. FIG. 2 is a block diagram of the eNB 100.

As shown in FIG. 2, the eNB has multiple antenna elements 101-1 to 101-n, a radio communication unit 110, a network communication unit 120, a storage unit 130, and a controller 140.

The antenna elements 101-1 to 101-n are used for transmission and reception of a radio signal. In the present embodiment, the antenna elements 101-1 to 101-n form an array antenna, for example.

The radio communication unit 110 is configured using, for example, a radio frequency (RF) circuit and a base band (BB) circuit and transmits/receives a radio signal via the antenna elements 101-1 to 101-n. Also, the radio communication unit 110 transmits a reference signal.

Also, the radio communication unit 110 performs processing (referred to as pre-coding) in which an antenna weight is multiplied for each of the antenna elements 101-1 to 101-n under control of the controller 140. Accordingly, a directivity pattern of the array antenna configured by the antenna elements 101-1 to 101-n can be changed.

Furthermore, the radio communication unit 110 can change transmission power of a radio signal to be transmitted via the antenna elements 101-1 to 101-n under control of the controller 140.

The network communication unit 120 performs inter-base station communications with a neighbor eNB on the X2 interface. Also, the network communication unit 120 performs communications with the EPC on an S1 interface.

The storage unit 130 stores various pieces of information to be used for controlling the eNB 100 or the like. For example, the storage unit 130 stores a neighbor eNB list (referred to as a neighbor list) for handover control.

The controller 140 controls various kinds of functions included in the eNB 100.

The controller 140 performs resource allocation to the UE 200. The controller 140 allocates one or multiple resource blocks to the UE 200 based on the CQI (Channel Quality Indicator) or the like reported by the UE 200. The CQI shows a received quality for each bandwidth (referred to as a sub-band) for each of the resource blocks. Then, the controller 140 performs control so as to perform radio communications with the UE 200 using the allocated resource block. The controller 140 also performs control on the transmission power in the radio communication unit 110.

In addition, the controller 140 performs handover control on the UE 200. The controller 140 determines the handover of the UE 200 and a handover target based on a measurement report reported by the UE 200. The measurement report contains information on the reference signal received power (RSRP) and reference signal received quality (RSRQ) measured by the UE 200 for the serving cell and the neighbor cell. Then, after performing communications with another eNB 100 determined as a handover target, the controller 140 performs control so as to transmit a handover instruction to the UE 200.

Furthermore, the controller 140 can perform adaptive array control for dynamically changing the directivity pattern of the array antenna. The adaptive array control includes beam forming in which a peak of the directivity pattern of the array antenna is directed to the UE 200 and null steering in which a null of the directivity pattern of the array antenna is directed to the UE 200. Based on the channel characteristic information based on the channel characteristic with the UE 200, the controller 140 calculates an antenna weight for performing the beam forming or the null steering for the UE 200 and sets the antenna weight to the radio communication unit 110. Here, PMI (Pre-coding Matrix Indicator) which is a feedback from the UE 200, for example, can be used as the channel characteristic information.

Figure 3:
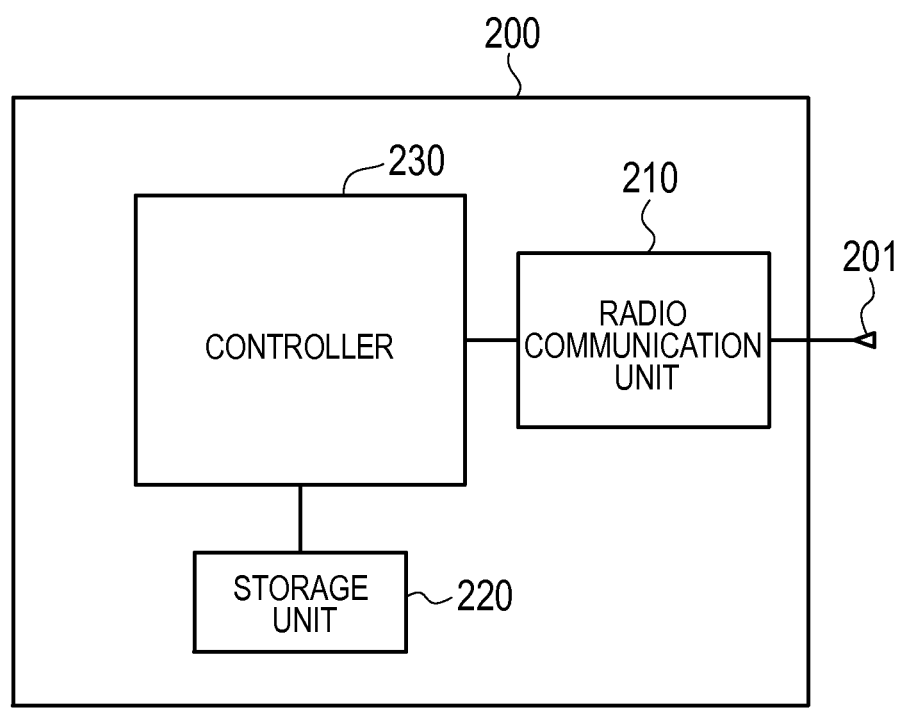
FIG. 3 is a block diagram of a UE according to the first to fourth embodiments.

Hereinafter, the configuration of the UE 200 is described. FIG. 3 is a block diagram of the UE 200.

As shown in FIG. 3, the UE 200 has an antenna 201, a radio communication unit 210, a storage unit 220, and a controller 230.

The antenna 201 is used for transmission and reception of a radio signal. The antenna 201 may include multiple antenna elements.

The radio communication unit 210 is configured using, for example, a RF circuit and a BB circuit and transmits/receives a radio signal via the antenna 201.

The storage unit 220 stores various pieces of information to be used for controlling the UE 200 or the like.

The controller 230 controls various kinds of functions included in the UE 200.

The controller 230 performs control so as to perform radio communications with the eNB 100 using one or multiple resource blocks which are allocated from the eNB 100.

Also, the controller 230 creates radio environment information such as CQI or a measurement report to perform control so that the radio environment information is transmitted (reported) to the eNB 100. Also, the controller 230 creates the channel characteristic information such as PMI to perform control so that the channel characteristic information is transmitted (reported) to the eNB 100.

Furthermore, in response to the handover instruction from the eNB 100, the controller 230 performs control so as to perform handover to a designated handover target.

Figure 4:
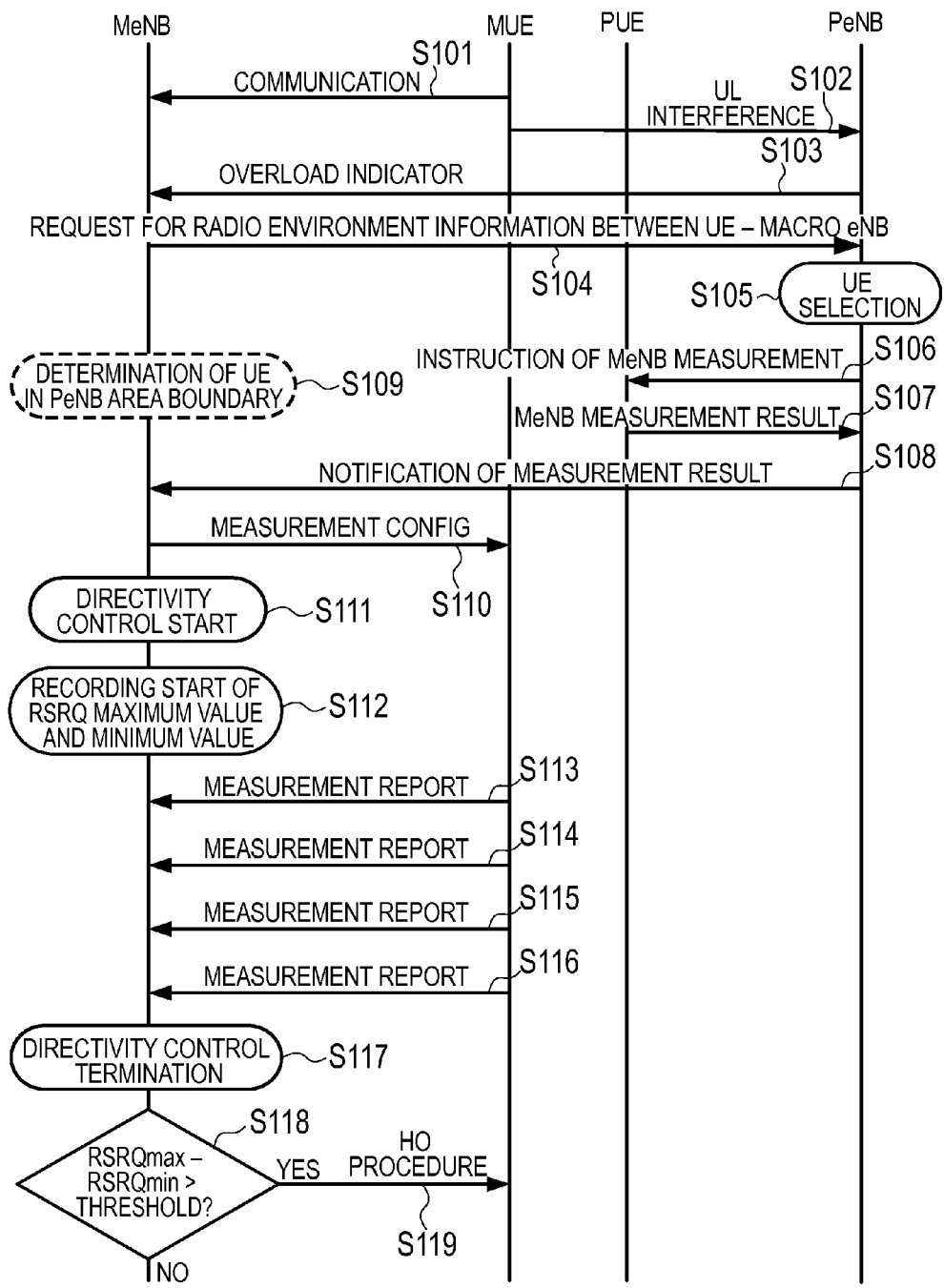
FIG. 4 is an operational sequence diagram of the mobile communication system according to the first embodiment.

Hereinafter, an operation of the mobile communication system according to the present embodiment is described. FIG. 4 is an operational sequence diagram of the mobile communication system according to the present embodiment. In the initial state of this operational sequence, the MeNB 100-1 and the PeNB 100-2 uses a common carrier C1 for an uplink.

As shown in FIG. 4, at step S101, the MUE 200-1 performs radio communications with the MeNB 100-1. At step S102, the PeNB 100-2 receives interference by an uplink signal from the MUE 200-1.

The PeNB 100-2 measures an interference level for each resource block in the uplink. At step S103, the PeNB 100-2 transmits Overload Indicator showing the interference level for each resource block in the uplink to the MeNB 100-1 on the X2 interface. With this, the uplink interference detected by the PeNB 100-2 is notified to the MeNB 100-1.

At step S104, in response to the Overload Indicator from the PeNB 100-2, the MeNB 100-1 transmits a transmission request (specific UE neighbor cell measurement result request) for the channel characteristic information on the path between the PUE 200-2 and the MeNB 100-1 to the PeNB 100-2 on the X2 interface.

At step S105, the PeNB 100-2 selects PUEs 200-2 located far from the PeNB 100-2 (for example, several farthest PeNBs) among multiple PUEs 200-2. The PUEs 200-2 located far are identified based on the radio environment information reported by the PUE 200-2 or a path loss measurement between the PeNB 100-2 and PUE 200-2. Or, when location information is reported by the PUE 200-2, a PUE 200-2 located far may be identified based on the location information and information on a coverage area radius.

At step S106, the PeNB 100-2 sends the PUE 200-2 selected at step S105 an instruction to measure a channel characteristic with the MeNB 100-1. The measurement instruction contains information (neighbor cell measurement result transmission request) for measuring the channel characteristic with the MeNB 100-1. The PUE 200-2 having received the measurement instruction measures the channel characteristic with the MeNB 100-1 based on the measurement instruction.

At step S107, the PUE 200-2 having received the measurement instruction transmits the channel characteristic information to the PeNB 100-2 based on the measurement result of the channel characteristic with the MeNB 100-1.

At step S108, the PeNB 100-2 transfer the channel characteristic information from the multiple the PUEs 200-2 to the MeNB 100-1 on the X2 interface. The MeNB 100-1 stores the channel characteristic information received from the PUE 200-2.

At step S109, the MeNB 100-1 determines a candidate MUE 200-1 which is located around the boundary of the coverage area of the PeNB 100-2. For example, a conceivable configuration is that when the MeNB 100-1 includes multiple sectors, transmission of a measurement report is requested only for the MUE 200-1 being connected with a sector in which the PeNB 100-2 exists.

At step S110, the MeNB 100-1 transmits measurement configuration information for instructing several times of measurement report transmission to the MUE 200-1 determined at step S109.

At step S111, based on the channel characteristic information received at step S108, the MeNB 100-1 starts controlling its own transmission directivity so as to change a radio environment around the boundary of the coverage area of the PeNB 100-2. Specifically, the MeNB 100-1 performs the null steering so as to sequentially direct null to PUEs 200-2 located far from the PeNB 100-2 one by one (that is, PUEs 200-2 around the boundary of the coverage area of the PeNB 100-2). Or, the null steering to direct null to multiple PUEs 200-2 around the boundary of the coverage area of the PeNB 100-2 at the same time may be performed intermittently. Or, the beam forming may be performed in place of the null steering.

At step S112, the MeNB 100-1 starts recording a maximum value (RSRQmax) and a minimum value (RSRQmin) of the RSRQ based on the measurement report from the MUE 200-1.

At step S113 to S116, the MeNB 100-1 receives the measurement report from the MUE 200-1 several times. The MeNB 100-1 acquires RSRQ contained in each measurement report, and compares these RSRQs, so that the RSRQmax and the RSRQmin are selected and the RSRQmax and the RSRQmin are recorded.

The RSRQ is equivalent to a ratio of the received power of the serving cell to the received power of a neighbor cell (for example, SNR or SINR). Due to the null steering started at step S111, the MUE 200-1 around the boundary of the coverage area of the PeNB 100-2 causes a large difference between the RSRQmax and the RSRQmin because the received power of the serving cell is temporarily dropped.

Or, when the beam forming is started at step S111, the MUE 200-1 around the boundary of the coverage area of the PeNB 100-2 causes a large difference between the RSRQmax and the RSRQmin because the received power of the serving cell is temporarily increased.

At step S117, the MeNB 100-1 terminates the directivity control for searching for an interfering UE.

At step S118, the MeNB 100-1 checks whether a difference between the RSRQmax and the RSRQmin (the RSRQmax–the RSRQmin) recorded at step S113 to step S116 exceeds a threshold. If the difference between the RSRQmax and the RSRQmin does not exceed the threshold (step S118; NO), the processing is terminated.

On the other hand, if the difference between the RSRQmax and the RSRQmin exceeds the threshold (step S118; YES), the MUE 200-1 is highly-likely to be located around the boundary of the coverage area of the PeNB 100-2, and thus is identified as the uplink interfering UE causing the interference to the PeNB 100-2. Then, at step S119, the MeNB 100-1 causes the MUE 200-1 to perform handover to the other cell (other carrier C2).

For example, in a case where the MeNB 100-1 uses the primary cell and the secondary cell together by carrier aggregation and where the MUE 200-1 supports the carrier aggregation and is accommodated in the primary cell, the handover is performed from the primary cell to the secondary cell. Or, if possible, the handover may be performed from the MUE 200-1 to the PeNB 100-2.

As described above, according to the present embodiment, the MeNB 100-1 performs the null steering (or the beam forming) so as to change the radio environment around the boundary of the coverage area of the PeNB 100-2 after the uplink interference is notified from the PeNB 100-2. Then, based on the measurement report from the MUE 200-1, the MeNB 100-1 identifies the MUE 200-1 whose received quality is dropped (or improved) as the interfering MUE 200-1. In this manner, the interfering MUE 200-1 is identified, so that the uplink interference in the heterogeneous network can be solved.

Modification of First Embodiment

Hereinafter, a modification of the first embodiment is described. The present modification is same as the first embodiment in that an MeNB 100-1 performs null steering (or beam foaming) but is different in processing relating to the null steering (or the beam forming). Also, the present modification assumes a TDD (Time Division Duplex) scheme.

Figure 5:
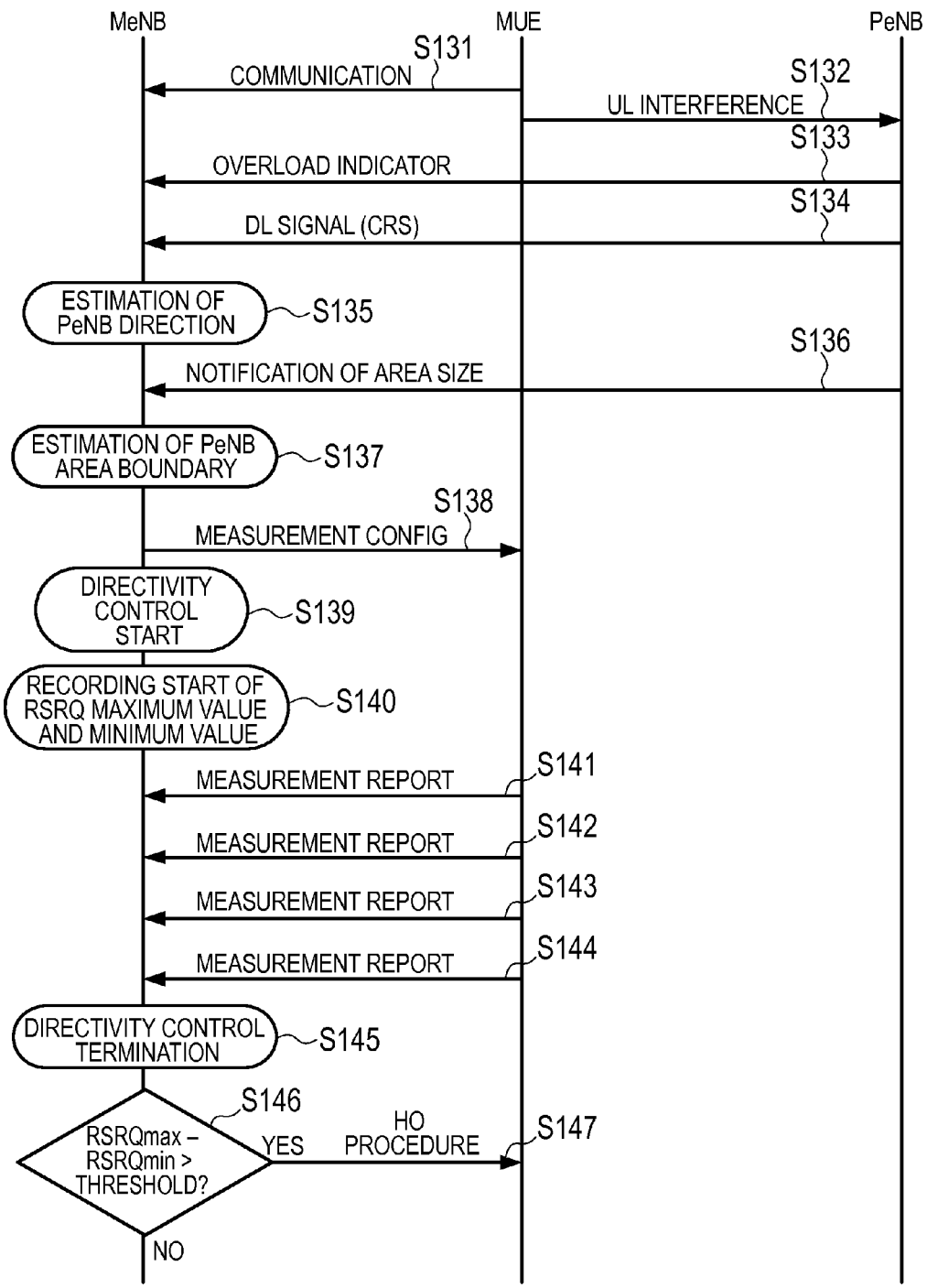
FIG. 5 is an operational sequence diagram of a mobile communication system according to a modification of the first embodiment.

FIG. 5 is an operational sequence diagram of a mobile communication system according to the present modification. In the initial state of this operational sequence, a MeNB 100-1 and a PeNB 100-2 use a common carrier C1 as an uplink.

As shown in FIG. 5, step S131 to step S133 are the same as the first embodiment.

At step S134, the MeNB 100-1 wirelessly receives a reference signal (more specifically, a cell specific reference signal (CSR)) transmitted from the PeNB 100-2.

At step S135, the MeNB 100-1 estimates a CRS arrival direction based on the CRS received at step S134 and stores the estimated direction.

At step S136, the PeNB 100-2 transmits size information indicating a size of its own coverage area to the MeNB 100-1 on the X2 interface. The size information may be information of a size classification such as a macro, pico, femto or may be information of a radius value.

At step S137, the MeNB 100-1 estimates a position in the boundary of the coverage area of the PeNB 100-2 based on the direction estimated at step S135 and the size information notified at step S136 (specifically, estimates a direction of the position).

At step S138, the MeNB 100-1 transmits measurement configuration information for instructing several times of measurement report transmission to the MUE 200-1.

At step S139, based on the position in the boundary of the coverage area of the PeNB 100-2 estimated at step S137, the MeNB 100-1 starts controlling its own transmission directivity control so as to change a radio environment around the boundary of the coverage area of the PeNB 100-2. For example, the MeNB 100-1 changes null in a range of the size indicated by the size information in the direction estimated at step S135.

Step S140 to step S147 are the same as the first embodiment.

According to the present modification, the effects same as those of the first embodiment can be obtained. Also, as compared with the first embodiment, signaling can be reduced.

Second Embodiment

Hereinafter, a second embodiment is mainly described in terms of differences with the first embodiment. In the present embodiment, not a MeNB 100-1 but a PeNB 100-2 performs null steering (or beam forming).

Figure 6:
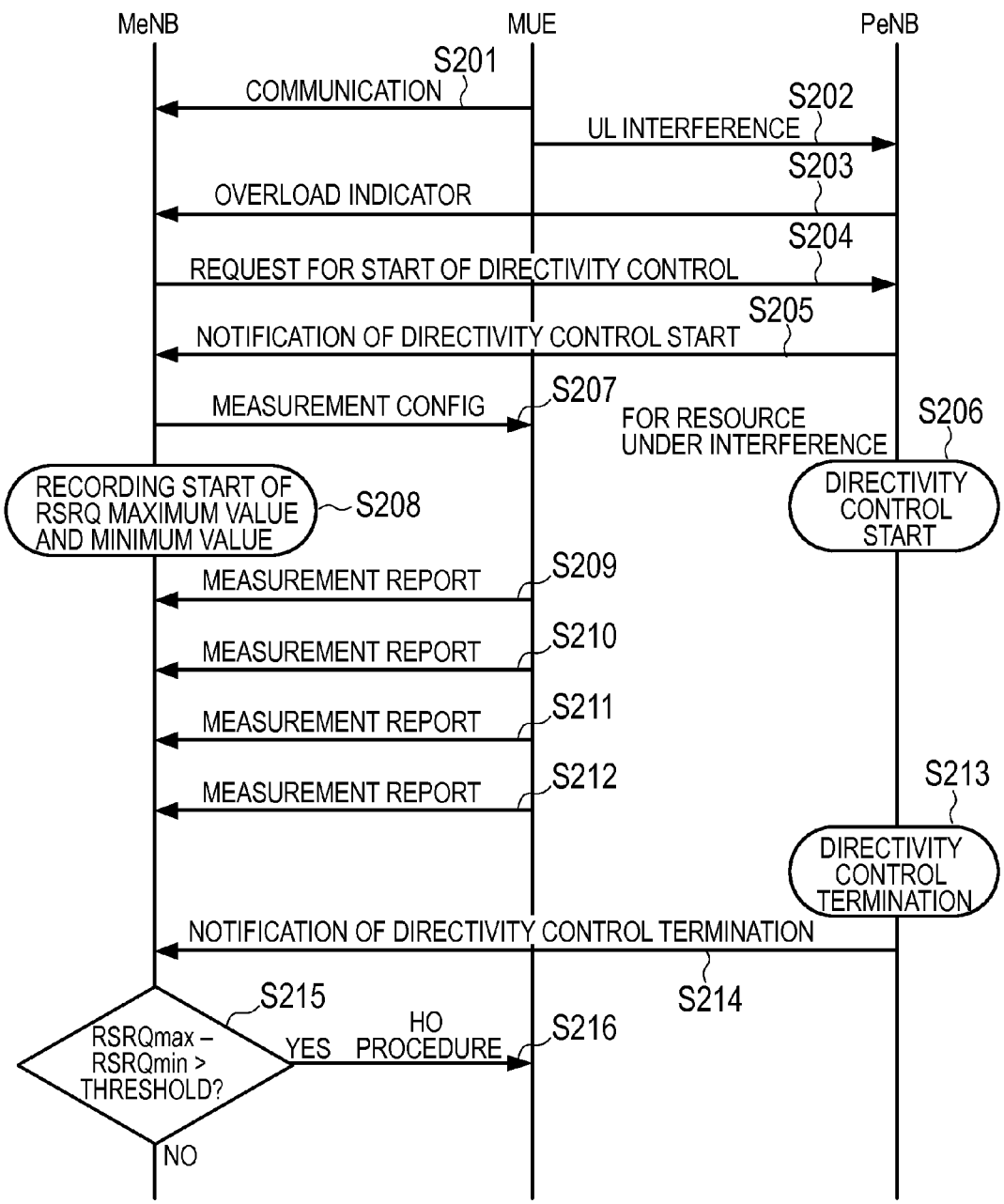
FIG. 6 is an operational sequence diagram of the mobile communication system according to the second embodiment.

FIG. 6 is an operational sequence diagram of a mobile communication system according to the present embodiment. In the initial state of this operational sequence, the MeNB 100-1 and the PeNB 100-2 uses a common carrier C1 as an uplink.

As shown in FIG. 6, at step S201, the MUE 200-1 performs radio communications with the MeNB 100-1. At step S202, the PeNB 100-2 receives interference by an uplink signal from the MUE 200-1.

The PeNB 100-2 measures an interference level for each resource block in the uplink. At step S203, the PeNB 100-2 transmits Overload Indicator showing the interference level for each resource block in the uplink to the MeNB 100-1 on the X2 interface. With this, the uplink interference detected by the PeNB 100-2 is notified to the MeNB 100-1.

At step S204, in response to the Overload Indicator from the PeNB 100-2, the MeNB 100-1 transmits a request for staring directivity control for searching for an interfering UE to the PeNB 100-2 on the X2 interface.

At step S205, in response to the request for staring the directivity control from the MeNB 100-1, the PeNB 100-2 transmits a notification for starting the directivity control to the MeNB 100-1 on the X2 interface.

At step S206, based on antenna weight information stored in advance, the PeNB 100-2 starts controlling its own transmission directivity so as to change the radio environment around the boundary of the coverage area of the PeNB 100-2. For example, the PeNB 100-2 performs null steering so as to rotate null by 360° around the PeNB 100-2 itself in the resource block in which (high) uplink interference is detected at step S202. Or, the beam forming may be performed in place of the null steering.

At step S207, the MeNB 100-1 transmits measurement configuration information for instructing several times of measurement report transmission to the MUE 200-1.

At step S208, the MeNB 100-1 starts recording a maximum value (RSRQmax) and a minimum value (RSRQmin) of RSRQ based on the measurement report from the MUE 200-1.

At step S209 to step S212, the MeNB 100-1 receives the measurement report several times from the MUE 200-1. The MeNB 100-1 acquires RSRQ contained in each measurement report, and compares these RSRQs, so that the RSRQmax and the RSRQmin are selected and the RSRQmax and the RSRQmin are recorded.

At step S213, the PeNB 100-2 terminates the directivity control for searching for the interfering UE. Note that, a period during which the directivity control for searching for the interfering UE is performed may be set in the MeNB 100-1 and the PeNB 100-2 in advance. Or it may be determined by the MeNB 100-1 and may be notified to the PeNB 100-2 by a directivity control start request (step S204), or may be determined by the PeNB 100-2 and be notified to the MeNB 100-1 by a directivity control start notification (step S205).

At step S214, the PeNB 100-2 transmits a notification for terminating the directivity control to the MeNB 100-1 on the X2 interface.

At step S215, the MeNB 100-1 checks whether a difference between the RSRQmax and the RSRQmin (the RSRQmax−the RSRQmin) recorded at step S209 to step S212 exceeds a threshold. If the difference between the RSRQmax and the RSRQmin does not exceed a threshold (step S215; NO), the processing is terminated.

On the other hand, if the difference between the RSRQmax and the RSRQmin exceeds the threshold (step S215; YES), the MUE 200-1 is likely to be located around the boundary of the coverage area of the PeNB 100-2, and thus is identified as the uplink interfering UE for the PeNB 100-2. Then, at step S216, the MeNB 100-1 causes the MUE 200-1 to perform handover to the other cell (the other carrier C2).

As described above, according to the present embodiment, the PeNB 100-2 performs the null steering (or the beam forming) so as to change the radio environment around the boundary of its own coverage area after the uplink interference is notified to the MeNB 100-1. Then, based on the measurement report from the MUE 200-1, the MeNB 100-1 identifies the MUE 200-1 whose received quality is dropped (or improved) as the interfering MUE 200-1. In this manner, the interfering MUE 200-1 is identified, so that the uplink interference in the heterogeneous network can be solved.

Third Embodiment

Hereinafter, a third embodiment is mainly described in terms of differences with the above-described embodiments.

In the present embodiment, a MeNB 100-1 performs transmission power control for searching for an interfering UE in place of transmission directivity control for searching for an interfering UE.

Under the situation shown in FIG. 1, when a MeNB 100-1 and a PeNB 100-2 use a common carrier C1, a downlink signal from the PeNB 100-2 is cancelled by a downlink signal from the MeNB 100-1. This causes that the MUE 200-1 cannot detect the downlink signal from the PeNB 100-2.

However, if power of the downlink signal from the MeNB 100-1 is decreased, the MUE 200-1 becomes capable of detecting the downlink signal from the PeNB 100-2, so that a measurement report can be reported. Thus, in the present embodiment, the MeNB 100-1 decreases its own transmission power so as to change a radio environment around the boundary of the coverage area of the PeNB 100-2. In addition, the MUE 200-1 that becomes capable of detecting the downlink signal from the PeNB 100-2 by decreasing the transmission power is identified as an interfering MUE 200-1.

Figure 7:
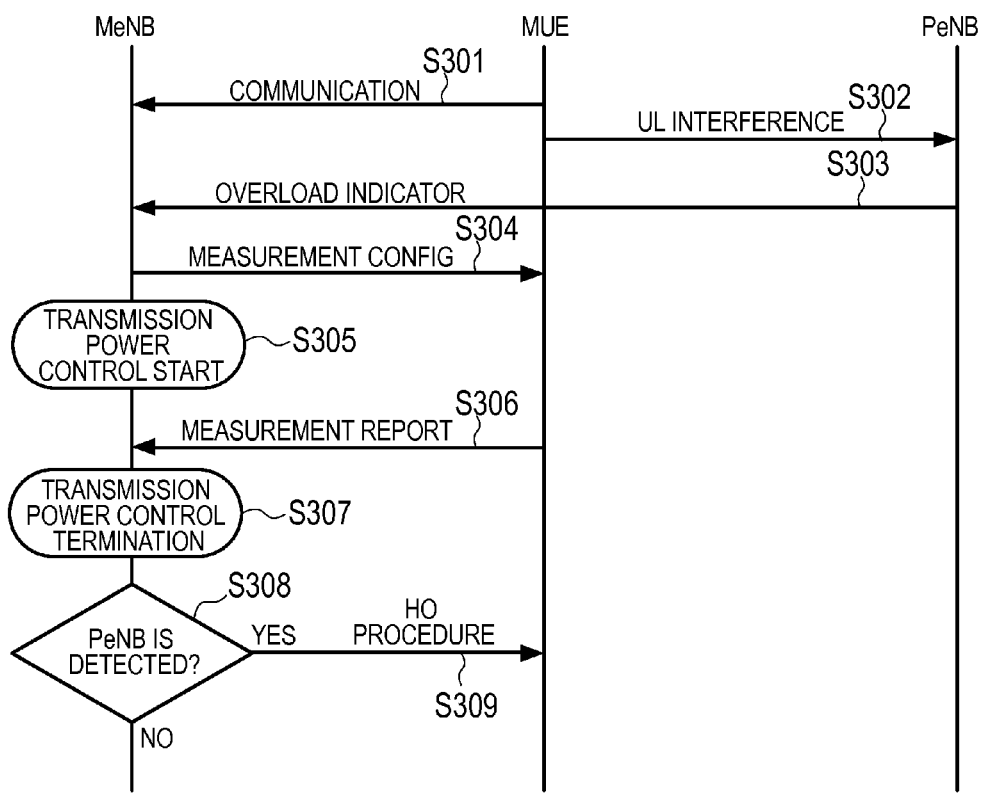
FIG. 7 is an operational sequence diagram of the mobile communication system according to the third embodiment.

FIG. 7 is an operational sequence diagram of a mobile communication system according to the present embodiment. In the initial state of this operational sequence, the MeNB 100-1 and the PeNB 100-2 use a common carrier C1 as an uplink. In addition, it is assumed that before starting this operational sequence, a measurement result for the PeNB 100-2 is not contained in the measurement report from the MUE 200-1 (in other words, the downlink signal from the PeNB 100-2 is not detected).

As shown in FIG. 7, at step S301, the MUE 200-1 performs radio communications with the MeNB 100-1. At step S302, the PeNB 100-2 receives interference by an uplink signal from the MUE 200-1.

The PeNB 100-2 measures an interference level for each resource block in the uplink. At step S303, the PeNB 100-2 transmits Overload Indicator showing the interference level for each resource block in the uplink to the MeNB 100-1 on the X2 interface. With this, the uplink interference detected by the PeNB 100-2 is notified to the MeNB 100-1.

At step S304, the MeNB 100-1 transmits measurement configuration information for instructing several times of measurement report transmission to the MUE 200-1.

At step S305, the MeNB 100-1 starts transmission power control for searching for an interfering UE. For example, the MeNB 100-1 decreases the transmission power of the downlink signal (such as a reference signal).

At step S306, the MeNB 100-1 receives measurement report from the MUE 200-1 and stores information contained in the measurement report.

At step S307, the MeNB 100-1 terminates the transmission power control for searching for the interfering UE. For example, the MeNB 100-1 restores the transmission power of the downlink signal (such as a reference signal).

At step S308, the MeNB 100-1 checks whether the measurement report received at step S306 contains the measurement result for the PeNB 100-2 (for example, the measurement result corresponding to a cell ID of the PeNB 100-2). If the measurement result for the PeNB 100-2 is not contained in the measurement report (step S308; NO), the processing is terminated.

On the other hand, if the measurement report for the PeNB 100-2 is contained in the measurement report (step S308; YES), the MUE 200-1 is likely to be located around the boundary of the coverage area of the PeNB 100-2 and thus is identified as the uplink interfering UE for the PeNB 100-2. Then, at step S309, the MeNB 100-1 causes the MUE 200-1 to perform handover to the other cell (the other carrier C2).

As described above, according to the present embodiment, the MeNB 100-1 decreases the transmission power so as to change the radio environment around the boundary of the coverage area of the PeNB 100-2 after the uplink interference is notified from the PeNB 100-2. Then, based on the measurement report from the MUE 200-1, the MeNB 100-1 identifies the MUE 200-1 which becomes capable of detecting the PeNB 100-2 as an interfering MUE 200-1. In this manner, the interfering MUE 200-1 is identified, so that the uplink interference in the heterogeneous network can be solved.

Fourth Embodiment

Hereinafter, a fourth embodiment is mainly described in terms of differences with the above-described embodiments. In the present embodiment, a PeNB 100-2 performs transmission power control for searching for an interfering UE.

Figure 8:
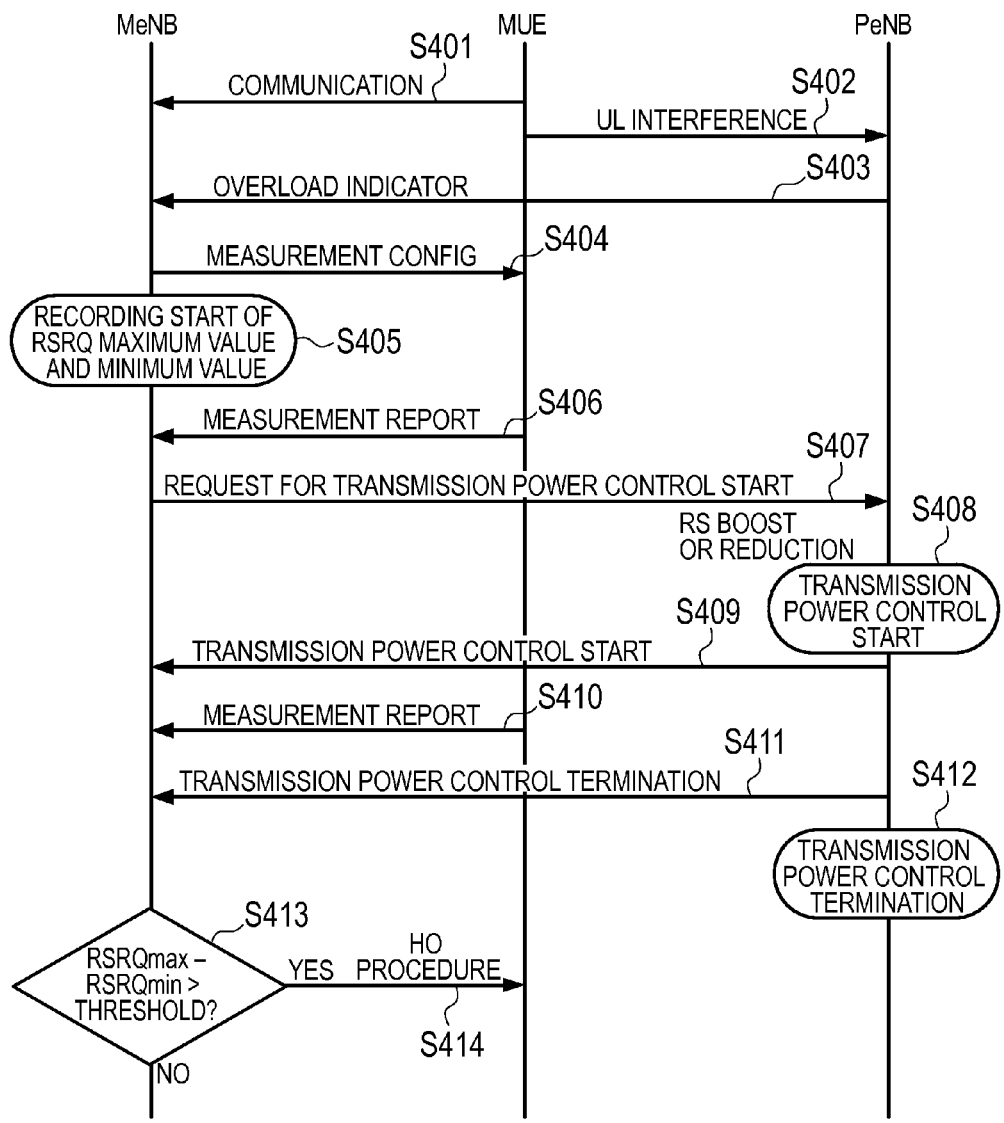
FIG. 8 is an operational sequence diagram of the mobile communication system according to the fourth embodiment.

FIG. 8 is an operational sequence diagram of a mobile communication system according to the present embodiment. In the initial state of this operational sequence, the MeNB 100-1 and the PeNB 100-2 use a common carrier C1 as an uplink.

As shown in FIG. 8, at step S401, the MUE 200-1 performs radio communications with the MeNB 100-1. At step S402, the PeNB 100-2 receives interference by an uplink signal from the MUE 200-1.

The PeNB 100-2 measures an interference level for each resource block in the uplink. At step S403, the PeNB 100-2 transmits Overload Indicator showing an interference level for each uplink resource block to the MeNB 100-1 on the X2 interface. With this, the uplink interference detected by the PeNB 100-2 is notified to the MeNB 100-1.

At step S404, the MeNB 100-1 transmits measurement configuration information for instructing several times of measurement report transmission to the MUE 200-1.

At step S405, the MeNB 100-1 starts recording a maximum value (RSRQmax) and a minimum value (RSRQmin) of RSRQ based on the measurement report from the MUE 200-1.

At step S406, the MeNB 100-1 receives the measurement report from the MUE 200-1. The MeNB 100-1 acquires RSRQ contained in the measurement report and records it (as a maximum value (RSRQmax)).

At step S407, the MeNB 100-1 transmits a request for starting the transmission power control for searching for an interfering UE to the PeNB 100-2 on the X2 interface.

At step S408, the PeNB 100-2 starts the transmission power control in response to the request for starting the transmission power control from the MeNB 100-1. Specifically, the PeNB 100-2 increases (boosts)) or decreases (reduces)) the transmission power of a reference signal or the like.

As a result of increasing (boosting) or decreasing (reducing) the transmission power of the reference signal by the PeNB 100-2, RSRQ of the MUE 200-1 located around the boundary of the coverage area of the PeNB 100-2 is deteriorated.

At step S409, the PeNB 100-2 transmits a notification for starting the transmission power control to the MeNB 100-1 on the X2 interface.

At step S410, the MeNB 100-1 receives the measurement report from the MUE 200-1. The MeNB 100-1 acquires RSRQ contained in the measurement report and records it (as a minimum value (RSRQmin)).

At step S411, the PeNB 100-2 transmits a notification for terminating the transmission power control for searching for an interfering UE to the MeNB 100-1 on the X2 interface. Note that, a period during which the transmission power control for searching for the interfering UE is performed may be set in the MeNB 100-1 and the PeNB 100-2 in advance. In this case, the notification is not needed.

At step S412, the PeNB 100-2 terminates the transmission power control for searching for the interfering UE. Specifically, the PeNB 100-2 restores the increased transmission power of a reference signal.

At step S413, the MeNB 100-1 checks whether a difference between the RSRQmax and the RSRQmin (the RSRQmax−the RSRQmin) recorded at step S406 and step S410 exceeds a threshold. If the difference between the RSRQmax and the RSRQmin does not exceed the threshold (step S413; NO), the processing is terminated.

On the other hand, when the difference between the RSRQmax and the RSRQmin (step S413; YES), the MUE 200-1 is likely to be located around the boundary of the coverage area of the PeNB 100-2, and thus is identified as the uplink interfering UE for the PeNB 100-2. Then, at step S414, the MeNB 100-1 causes the MUE 200-1 to perform handover to the other cell (the other carrier C2).

As described above, according to the present embodiment, the PeNB 100-2 performs the transmission power control so as to change the radio environment around the boundary of its own coverage area after the uplink interference is notified to the MeNB 100-1. Then, based on the measurement report from the MUE 200-1, the MeNB 100-1 identifies the MUE 200-1 whose received quality is dropped as the interfering MUE 200-1. In this manner, the interfering MUE 200-1 is identified, so that the uplink interference in the heterogeneous network can be solved.

First Modification of Fourth Embodiment

Hereinafter, a first modification of the fourth embodiment is described. The present modification is same as the fourth embodiment in that a PeNB 100-2 performs transmission power control but is different in processing relating to identification of an interfering MUE 200-1.

Figure 9:
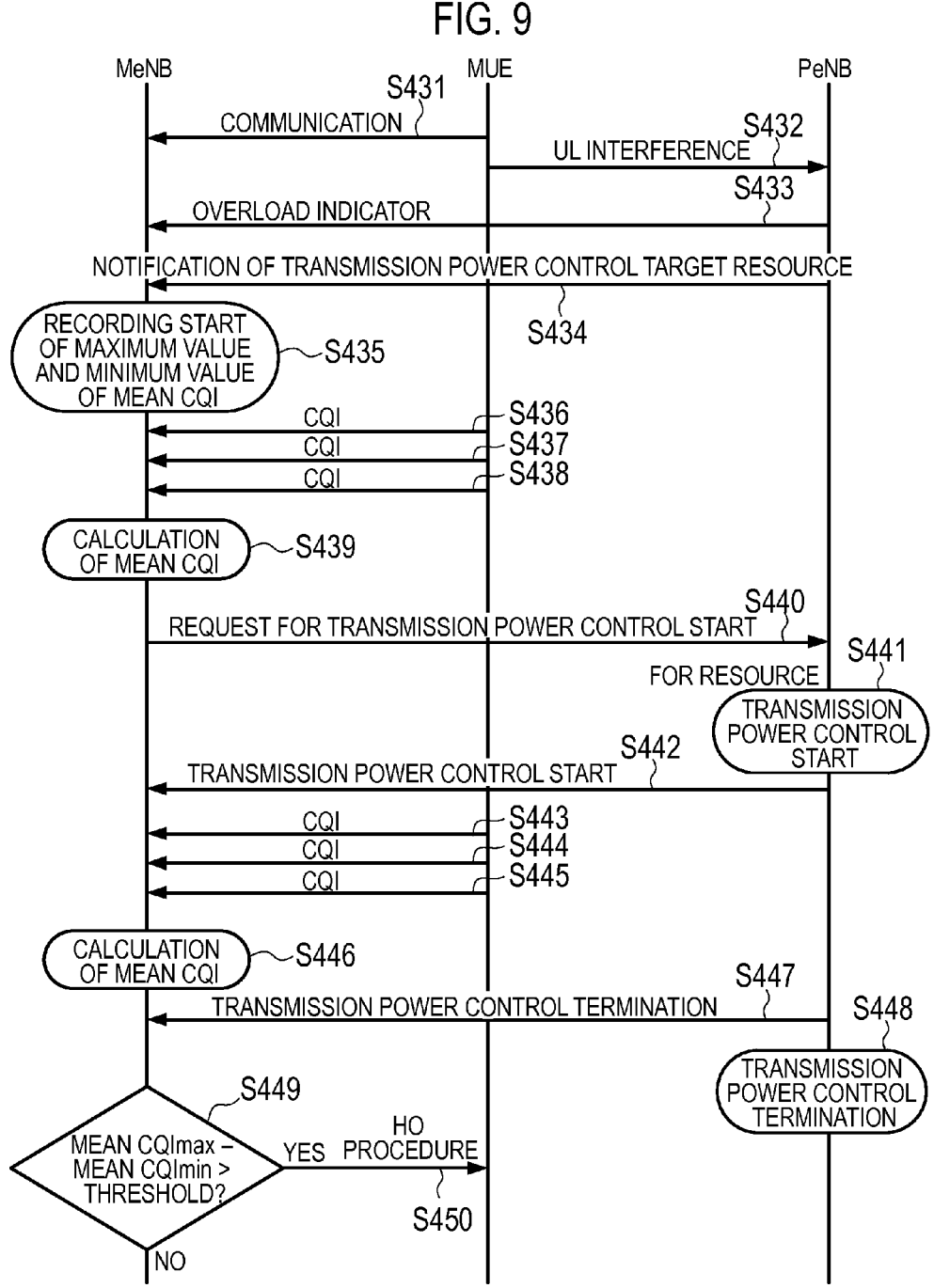
FIG. 9 is an operational sequence diagram of a mobile communication system according to a first modification of the fourth embodiment.

FIG. 9 is an operational sequence diagram of a mobile communication system according to the present modification. In the initial state of this operational sequence, a MeNB 100-1 and a PeNB 100-2 use a common carrier C1 as an uplink.

As shown in FIG. 9, step S431 to step S433 are the same as the fourth embodiment.

At step S434, the PeNB 100-2 transmits a control target resource notification to perform transmission power control on the resource block in which (high) uplink interference is detected at step S432 to the MeNB 100-1 on the X2 interface.

At step S435, the MeNB 100-1 starts recording a maximum value (mean CQImax) and minimum value (mean CQImin) of a mean CQI based on the CQI report from the MUE 200-1.

At step S436 to step S438, the MeNB 100-1 receives the CQI report several times from the MUE 200-1. At step S439, the MeNB 100-1 calculates and records a mean CQI of the CQI received at step S436 to step S438.

At step S440, the MeNB 100-1 transmits a request for starting the transmission power control for searching for an interfering UE to the PeNB 100-2 on the X2 interface.

At step S441, the PeNB 100-2 starts the transmission power control in response to the request for starting the transmission power control from the MeNB 100-1. Specifically, the PeNB 100-2 increases or decreases the transmission power for the resource block in which (high) uplink interference is detected at step S432.

When the PeNB 100-2 increases the transmission power, the mean CQI of the MUE 200-1 located around the boundary of the coverage area of the PeNB 100-2 is deteriorated. On the other hand, when the PeNB 100-2 decreases the transmission power, the mean CQI of the MUE 200-1 located around the boundary of the coverage area of the PeNB 100-2 is improved.

At step S442, the PeNB 100-2 transmits a notification for starting the transmission power control to the MeNB 100-1 on the X2 interface.

At step S443 to step S445, the MeNB 100-1 receives the CQI report several times from the MUE 200-1.

At step S446, the MeNB 100-1 calculates and records a mean CQI of the CQI received at step S443 to step S445.

At step S447, the PeNB 100-2 transmits a notification for terminating the transmission power control for searching for the interfering UE to the MeNB 100-1 on the X2 interface. Note that, a period during which the transmission power control for searching for the interfering UE is performed may be set in the MeNB 100-1 and the PeNB 100-2 in advance. In this case, the notification is not needed.

At step S448, the PeNB 100-2 terminates the transmission power control for searching for the interfering UE. Specifically, the PeNB 100-2 restores the increased or decreased transmission power of a reference signal.

At step S449, the MeNB 100-1 checks whether the difference between the mean CQImax and the mean CQImin (the mean CQImax−the mean CQImin) recorded at step S439 and step S446 exceeds a threshold. If the difference between the mean CQImax and the mean CQImin does not exceed the threshold (step S449; NO), the processing is terminated.

On the other hand, if the difference between the mean CQImax and the mean CQImin exceeds the threshold (step S449; YES), the MUE 200-1 is likely to be located around the boundary of the coverage area of the PeNB 100-2, and thus is identified as the uplink interfering UE for the PeNB 100-2. Then, at step S450, the MeNB 100-1 causes the MUE 200-1 to perform handover to the other cell (the other carrier C2).

Second Modification of Fourth Embodiment

Hereinafter, a second modification of the fourth embodiment is described. The present modification is same as the fourth embodiment in that a PeNB 100-2 performs transmission power control, but a method of identifying an interfering UE similar to the method described in the third embodiment is applied.

Figure 10:
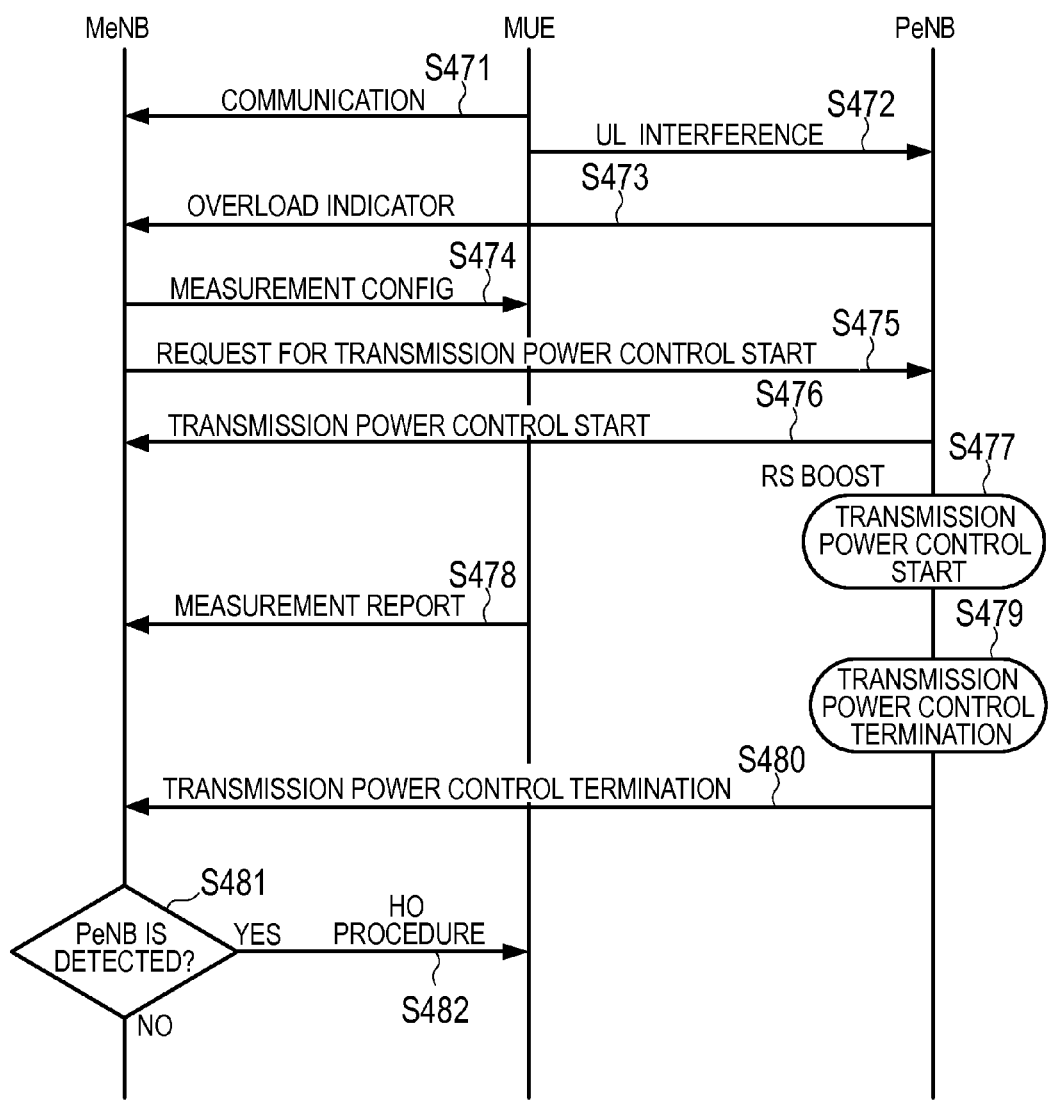
FIG. 10 is an operational sequence diagram of a mobile communication system according to a second modification of the fourth embodiment.

FIG. 10 is an operational sequence diagram of a mobile communication system according to the present modification. In the initial state of this operational sequence, the MeNB 100-1 and the PeNB 100-2 use a common carrier C1 as an uplink. In addition, it is assumed that before starting this operational sequence, a measurement result for the PeNB 100-2 is not contained in the measurement report from the MUE 200-1 (in other words, the downlink signal from the PeNB 100-2 is not detected).

As shown in FIG. 10, step S471 to step S473 are the same as the fourth embodiment.

At step S474, the MeNB 100-1 transmits measurement configuration information for instructing several times of measurement report transmission to the MUE 200-1.

At step S475, the MeNB 100-1 transmits a request for starting the transmission power control for searching for an interfering UE to the PeNB 100-2 on the X2 interface.

At step S476, the PeNB 100-2 transmits a notification for starting the transmission power control to the MeNB 100-1 on the X2 interface.

At step S477, the PeNB 100-2 starts the transmission power control in response to the request for starting the transmission power control from the MeNB 100-1. Specifically, the PeNB 100-2 increases (boost) the transmission power of a reference signal.

At step S478, the MeNB 100-1 receives the measurement report from the MUE 200-1. The MeNB 100-1 records information contained in the measurement report.

At step S479, the PeNB 100-2 terminates the transmission power control for searching for the interfering UE. Specifically, the PeNB 100-2 restores the increased transmission power of a reference signal.

At step S480, the PeNB 100-2 transmits a notification for terminating the transmission power control for searching for the interfering UE to the MeNB 100-1 on the X2 interface. Note that, a period during which the transmission power control for searching for the interfering UE is performed may be set in the MeNB 100-1 and the PeNB 100-2 in advance. In this case, the notification is not needed.

At step S481, the MeNB 100-1 checks whether the measurement report received at step S478 contains the measurement result for the PeNB 100-2 (for example, the measurement result corresponding to a cell ID of the PeNB 100-2). If the measurement result for the PeNB 100-2 is not contained (step S481; NO), the processing is terminated.

On the other hand, if the measurement report for the PeNB 100-2 is contained in the measurement report (step S481; YES), the MUE 200-1 is likely to be located around the boundary of the coverage area of the PeNB 100-2 and thus is identified as the uplink interfering UE for the PeNB 100-2. Then, at step S482, the MeNB 100-1 causes the MUE 200-1 to perform handover to the other cell (the other carrier C2).

Other Embodiments

It should not be understood that the description and drawings which constitute one part of this disclosure limit the present invention. Various alternative embodiments, examples, and operational techniques will be apparent for those who are in the art from this disclosure.

In each of the above-described embodiments, an interfering UE is identified from all MUEs 200-1 based on the measurement reports. However, as described below, an interfering UE may be identified after a target MUE 200-1 is selected.

FIG. 11 is another operational sequence according to the first embodiment.

As shown in FIG. 11, step S151 to step S159 are the same as the first embodiment.

At step S160, a MeNB 100-1 performs setting for an MUE 200-1 so as to change a trigger of a measurement report. For example, in a case where a measurement report is made using such a trigger (referred to as "event A3") that a value obtained by adding an offset value to a measurement result of a neighbor cell is better than a measurement result of a serving cell (primary cell), the offset value is made smaller to cause the measurement report of the neighbor cell (that is, PeNB 100-2) to be easily generated.

Step S161 and step S162 are the same as the first embodiment. Step S163 to step S166, the MUE 200-1 transmits a measurement report to the MeNB 100-1 according to a changed trigger.

After the transmission directivity control is terminated at step S167, at step S168, the MeNB 100-1 selects the MUE 200-1 to which the measurement report is transmitted (step S163 to step S166) according to the changed trigger as a target MUE 200-1 to be an interfering UE candidate and requests the target MUE 200-1 to report a current RSRQ. Step S169 to step S171 are the same as the first embodiment.

In this manner, an interfering UE is identified after a target MUE 200-1 is selected, so that the number of MUEs 200-1 to which the measurement report is transmitted can be reduced.

FIG. 12 is another operational sequence according to the modification of the first embodiment.

As shown in FIG. 12, step S175 to step S181 are the same as the first embodiment.

At step S182, the MeNB 100-1 performs setting for the MUE 200-1 so as to change a trigger of a measurement report. For example, in a case where a measurement report is made using such a trigger (referred to as "event A3") that a value obtained by adding an offset value to a measurement result of a neighbor cell is better than a measurement result of a serving cell (primary cell), the offset value is made smaller to cause the measurement report of the neighbor cell (that is, the PeNB 100-2) to be easily generated.

Step S183 and step S184 are the same as the first embodiment. At step S185 to step S188, the MUE 200-1 transmits a measurement report to the MeNB 100-1 according to a changed trigger.

After the transmission directivity control is terminated at step S189, at step S190, the MeNB 100-1 selects the MUE 200-1 to which the measurement report is transmitted (step S185 to step S188) according to the changed trigger as a target MUE 200-1 to be an interfering UE candidate and requests the target MUE 200-1 to report a current RSRQ. Step S191 to step S193 are the same as the first embodiment.

In this manner, an interfering UE is identified after a target MUE 200-1 is selected, so that the number of MUEs 200-1 to which the measurement report is transmitted can be reduced. The above-described embodiments are not limited to the case where they are implemented individually but may be implemented in combination.

Each of the above-described embodiments may be performed separately and independently and may also be performed through a combination thereof.

In addition, the information which is transmitted and received on the X2 interface in each of the above-described embodiments may be transmitted and received on an S1 interface via EPC.

Furthermore, in each of the above-described embodiments, the description is given using the combination of a MeNB and a PeNB as an example, but it may be a combination of a MeNB and a femtocell (HeNB), or a combination of a PeNB and a femtocell (HeNB).

In addition, the entire content of U.S. Provisional Application No. 61/555,250 (filed on Nov. 3, 2011) is incorporated in the present specification by reference.

INDUSTRIAL APPLICABILITY

As described above, since the present invention can identify an uplink interfering user terminal, and thus, the present invention is useful in a radio communication field such as a mobile communication.

The invention claimed is:

1. A communication control method, comprising:
transmitting, from a first communication apparatus managing a first cell to a second communication apparatus managing a second cell, a request to change a radio environment of the second cell, on a S1 interface via an Evolved Packet Core (EPC), and
changing, by the second communication apparatus, the radio environment of the second cell by increasing a transmission power of a radio signal of the second cell, in response to the request, wherein
the request includes information on a period during which the second communication apparatus changes the radio environment.

2. A first communication apparatus, comprising:
a controller, wherein the controller is configured to
manage a first cell; and
transmit, to a second communication apparatus managing a second cell, a request to change a radio environment of the second cell by increasing a transmission power of a radio signal of the second cell, on a S1 interface via an Evolved Packet Core (EPC), and
the request includes information on a period during which the second communication apparatus changes the radio environment.

3. A second communication apparatus, comprising:
a controller, wherein the controller is configured to
manage a second cell;
receive, from a first communication apparatus managing a first cell, a request to change a radio environment of the second cell, on a S1 interface via an Evolved Packet Core (EPC); and
change the radio environment of the second cell by increasing a transmission power of a radio signal of the second cell, in response to the request, and
the request includes information on a period during which the base station changes the radio environment.

* * * * *